(12) United States Patent
Kim

(10) Patent No.: US 10,433,127 B2
(45) Date of Patent: Oct. 1, 2019

(54) IN-VEHICLE RADIO FREQUENCY BAND MANAGEMENT SYSTEM AND CONTROLLING METHOD THEREOF

(71) Applicants: HYUNDAI MOTOR COMPANY, Seoul (KR); KIA MOTORS CORPORATION, Seoul (KR)

(72) Inventor: Joon Young Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 15/823,035

(22) Filed: Nov. 27, 2017

(65) Prior Publication Data

US 2018/0183674 A1 Jun. 28, 2018

(30) Foreign Application Priority Data

Dec. 28, 2016 (KR) .................. 10-2016-0181203

(51) Int. Cl.
*H04L 12/24* (2006.01)
*H04L 12/801* (2013.01)
(Continued)

(52) U.S. Cl.
CPC ........... *H04W 4/48* (2018.02); *H04L 41/0853* (2013.01); *H04L 41/0896* (2013.01);
(Continued)

(58) Field of Classification Search
CPC . H04L 41/0853; H04L 41/0896; H04L 47/15; H04L 47/525; H04L 47/822; H04L 67/12; H04L 67/125; H04W 4/04; H04W 4/046; H04W 4/30; H04W 4/38–48; H04W 28/16; H04W 28/18; H04W 28/20; H04W 28/26; H04W 72/0406; H04W 72/0413; H04W 72/042; H04W 72/0453
See application file for complete search history.

(56) References Cited

U.S. PATENT DOCUMENTS

| 2009/0310571 | A1 | 12/2009 | Matischek et al. |
| 2011/0110397 | A1* | 5/2011 | Mochizuki ............ H04W 28/20 375/130 |

(Continued)

FOREIGN PATENT DOCUMENTS

| JP | 2002-135758 A | 5/2002 |
| JP | 2005-222307 A | 8/2005 |

(Continued)

*Primary Examiner* — Timothy J Weidner
(74) *Attorney, Agent, or Firm* — Morgan, Lewis & Bockius LLP

(57) ABSTRACT

A method of optimizing a frequency band by a vehicle controller includes, upon wirelessly connecting a new device to the vehicle controller, first determining frequency characteristic of the new device, second determining whether a frequency band is capable of being allocated to the new device in an available frequency band by using the determined frequency characteristic, and when the frequency band is not capable of being allocated to the new device as the second determination result, readjusting a bandwidth occupied by one or more pre-connected devices to ensure a band to be allocated to the new device.

15 Claims, 6 Drawing Sheets

(51) Int. Cl.
  *H04L 12/877*  (2013.01)
  *H04L 12/911*  (2013.01)
  *H04L 29/08*   (2006.01)
  *H04W 4/48*    (2018.01)
  *H04W 28/26*   (2009.01)
  *H04W 72/04*   (2009.01)

(52) U.S. Cl.
  CPC ............ *H04L 47/15* (2013.01); *H04L 47/525* (2013.01); *H04L 47/822* (2013.01); *H04L 67/125* (2013.01); *H04W 28/26* (2013.01); *H04W 72/042* (2013.01); *H04W 72/0406* (2013.01); *H04W 72/0413* (2013.01); *H04W 72/0453* (2013.01)

(56) References Cited

U.S. PATENT DOCUMENTS

2011/0134889 A1* 6/2011 Harvey ................. H04W 16/14
                                                  370/335
2017/0251470 A1* 8/2017 Wang .................... H04W 72/04
                                                  370/336

FOREIGN PATENT DOCUMENTS

| JP | 2009-129083 A | 6/2009 |
| JP | 2010-173366 A | 8/2010 |
| JP | 2012-176654 A | 9/2012 |

\* cited by examiner

IN-VEHICLE RADIO FREQUENCY BAND MANAGEMENT SYSTEM AND CONTROLLING METHOD THEREOF

CROSS-REFERENCE(S) TO RELATED APPLICATIONS

This application claims the benefit of priority to Korean Patent Application No. 10-2016-0181203, filed on Dec. 28, 2016, which is hereby incorporated by reference as if fully set forth herein.

TECHNICAL FIELD

The present disclosure relates to a frequency band management system and a controlling method thereof, and more particularly, to a frequency band management system and a controlling method thereof, for adjusting a frequency band occupied by a plurality of wireless devices that use similar frequency bands in consideration of a vehicle environment.

BACKGROUND

The Internet of things (IoT) refers to a physical network via which an object including a sensor and a communication chip installed therein automatically transmits and receives data in real time without human intervention. In an IoT environment, devices (objects) with a sensor or a communication function may be connected via the Internet to collect surrounding information and may transmit and receive data to and from other devices to make an appropriate decision.

That is, the IoT refers to communication between objects that use wireless and wired networks based on a sensor and chip attached to an IoT device and is based on Bluetooth, near field communication, (NFC), sensor data, a network, and so on.

In particular, the IoT is capable of manipulating residential electronic products using a smartphone out of doors, and thus, recently, the IoT has attracted much attention and combination with vehicles has actively attempted along with a concept of a smart car and a connected car.

Due to establishment of various wireless communication standards along with growth with geometric progression in the number of IoT devices, the possibility that multiple devices simultaneously use a frequency band of 900 MHz when using the frequency band is increased. In particular, when IoT devices are used in a vehicle, frequency interference may be caused to disable communication, and thus, there is an abrupt need to manage a frequency band.

SUMMARY

An object of the present disclosure is to provide a radio frequency band management system and a controlling method thereof, for more effectively managing a radio frequency band.

In particular, an object of the present disclosure is to provide a radio frequency band management system and a controlling method thereof using determination and application of frequency band readjustment of multiple devices in a vehicle environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of optimizing a frequency band by a vehicle controller includes, upon wirelessly connecting a new device to the vehicle controller, first determining frequency characteristic of the new device, second determining whether a frequency band is capable of being allocated to the new device in an available frequency band by using the determined frequency characteristic, and when the frequency band is not capable of being allocated to the new device as the second determination result, readjusting a bandwidth occupied by one or more pre-connected devices to ensure a band to be allocated to the new device.

In another aspect of the present disclosure, a frequency band management controller of a vehicle for optimizing a frequency band includes a wireless communication unit configured to wirelessly exchange data with one or more device, and a controller configured to, upon connecting a new device through the wireless communication unit, determine frequency characteristic of the new device, determine whether a frequency band is capable of being allocated to the new device in an available frequency band by using the determined frequency characteristic, and, when the frequency band is not capable of being allocated to the new device, readjust a bandwidth occupied by one or more pre-connected devices to ensure a band to be allocated to the new device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Figure 1A:
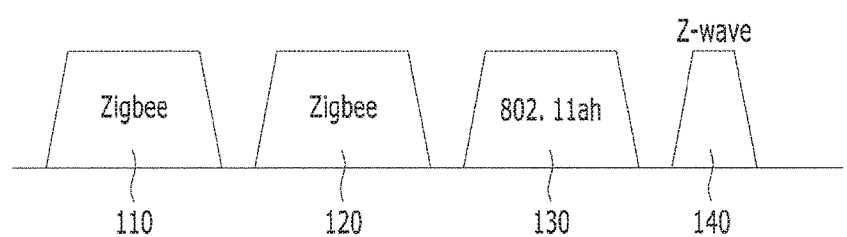
FIGS. 1A and 1B illustrate an example in which frequency band readjustment is performed according to an embodiment of the present disclosure.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout this specification, unless explicitly described to the contrary, the word "comprise" and variations such as "comprises" or "comprising", will be understood to imply the inclusion of stated elements but not the exclusion of any other elements. In addition, the same reference numbers will be used throughout the drawings to refer to the same or like parts.

Embodiments of the present disclosure propose a frequency band efficiency system and a controlling method thereof using determination and application of frequency band readjustment of multiple devices in the case of entrance into a new device or according to a vehicle driving state.

First, a concept of frequency band readjustment of will be described with reference to FIGS. 1A and 1B.

Figure 1B:
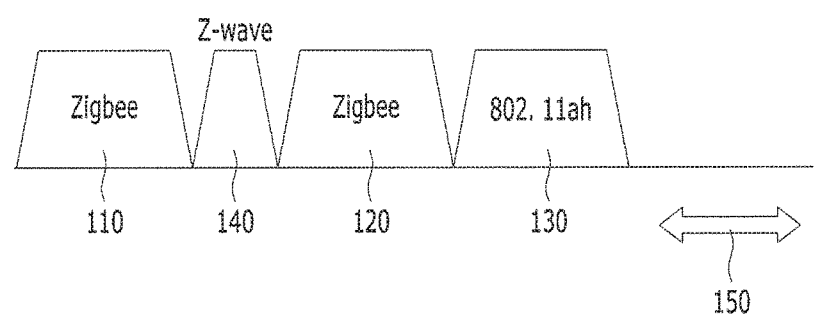

FIGS. 1A and 1B illustrate an example in which frequency band readjustment is performed according to an embodiment of the present disclosure. In FIGS. 1A and 1B, a horizontal axis indicates a frequency and a length of the horizontal axis indicates a range of a currently available band. An area of each polygon, a lower base of which is the horizontal axis, indicates a size of a radio resource occupied by each device.

Referring to FIG. 1A, it may be assumed that a radio resource 110 occupied by a first device using the Zigbee protocol, a radio resource 120 occupied by a second device using the Zigbee protocol, a radio resource 130 occupied by a third device using the Wi-Fi (e.g., 802.11ah) protocol, and a radio resource 140 occupied by a fourth device using the Z-wave protocol are arranged from the left on the frequency axis. In this case, a radio resource occupied by each device has an arbitrary frequency interval in similar frequency bands, and thus, the radio resource corresponding interval is not capable of being used and it is difficult for a new device to enter an available frequency band, thereby degrading efficiency of use of radio resources.

Accordingly, as shown in FIG. 1B, when a frequency arrangement order and interval of radio resources occupied by respective devices are changed, a frequency band 150 in which a new device is capable of being used in an available frequency band may be ensured.

Hereinafter, the frequency band readjustment procedure described with reference to FIG. 1 will be described in more detail with reference to FIGS. 2 and 3.

Figure 2:
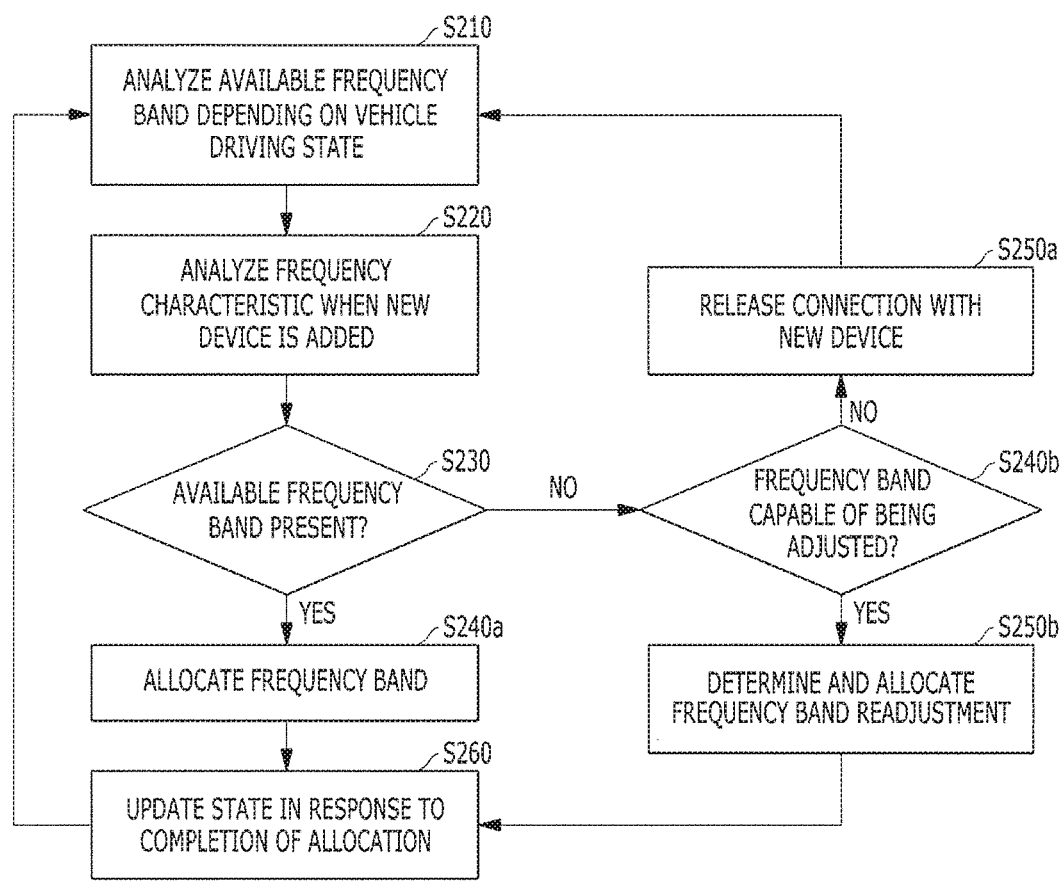
FIG. 2 is a diagram illustrating an example of a frequency band readjustment procedure according to an embodiment of the present disclosure.

FIG. 2 is a diagram illustrating an example of a frequency band readjustment procedure according to an embodiment of the present disclosure.

Each operation of FIG. 2 is assumed to be performed by a frequency management device (hereinafter, referred to as a "frequency manager" for convenience) disposed in a vehicle. The frequency manager may be assumed to wirelessly exchange data with a mobile device such as a plurality of IoT devices that are capable of performing wireless communication and to transmit a control signal for changing a wireless communication operation state of a corresponding mobile device to each connected mobile device. Hereinafter, for convenience, a plurality of devices connected to the frequency manager will be referred to as a "device" unless there is no different disclosure.

Referring to FIG. 2, the frequency manager may determine a current vehicle driving state and, upon determining that the current state is a stop state, the frequency manager may search for a surrounding frequency band to recognize an available bandwidth (S210). In the case of a driving state, the frequency manager may check only a connection state of a currently connected device or perform only an operation of adding a new device. Currently, most IoT devices use a band of 900 MHz and a band of 902 to 928 MHz is internationally determined as an unlicensed band (ISM band) and, thus, search and analysis may be performed on the basis of the corresponding band.

When a new device is added, the frequency manager may analyze packet information exchanged with a corresponding device during a connection procedure to analyze frequency characteristics of the connected device (S220). The present procedure may be performed by calculating a used area of a bandwidth by the frequency manager based on transmitted and received packet information and, in this case, the frequency manager previously has center frequency band channel information and basic bandwidth information of standard protocols such as Zigbee, Z-wave, and IEEE 802.11ah, which are currently applied to a band of 900 MHz. For example, when a center frequency of a new device that operates according to the Z-Wave protocol is 908.46 MHz and a bandwidth is 300 kHz, the frequency manager may determine that a corresponding device uses a region corresponding to 908.29 to 908.61 MHz. As another example, when a center frequency of a new device that operates according to the 802.11ah protocol is 910.5 MHz and a bandwidth is 2 MHz, the frequency manager may determine that a corresponding device uses a region corresponding to 909.5 to 911.5 MHz.

Upon completing the frequency characteristic analysis of a new device, the frequency manager may determine whether there is a band to be allocated with respect to a corresponding device in an available band, based on the analysis result (S230).

As the determination result, when there is an idle band to be allocated, the frequency manager may transmit information on the idle band to a corresponding device and allocate a frequency band (S240A) and update state information on an available frequency band in response to completion of allocation (S260). Accordingly, the corresponding device may operate in a band allocated by the frequency manager.

When there is no frequency band to be just allocated to a new device in a current available frequency band, the frequency manager may readjust a bandwidth occupied by another pre-connected device and determine whether a band to be allocated to a new device is capable of being ensured (S240B).

To this end, the frequency manager may determine whether a frequency band of at least some devices is capable of being shifted and a bandwidth to be ensured based on the shift result using information on center frequency and bandwidth information of a pre-connected device as well as a new device.

As the determination result, when it is difficult to readjust a bandwidth or difficult to ensure a bandwidth for a new device even if readjustment is performed, the frequency manager may release connection with the new device (S250A).

On the contrary, when bandwidth readjustment is possible, the frequency manager may transmit an on and off control signal and frequency band information to be newly allocated to each device as a frequency shift target (S250B). For example, the frequency manager may control each device to release connection with a device with lowest data traffic, and then, to perform reconnection with a re-allocated new band. Damage of frequency readjustment may be minimized through this procedure.

When frequency readjustment is completed, the frequency manager may update state information on an available frequency band (S260).

Hereinafter, a frequency readjustment procedure will be described in more detail with reference to FIGS. 3 to 4D.

Figure 3:
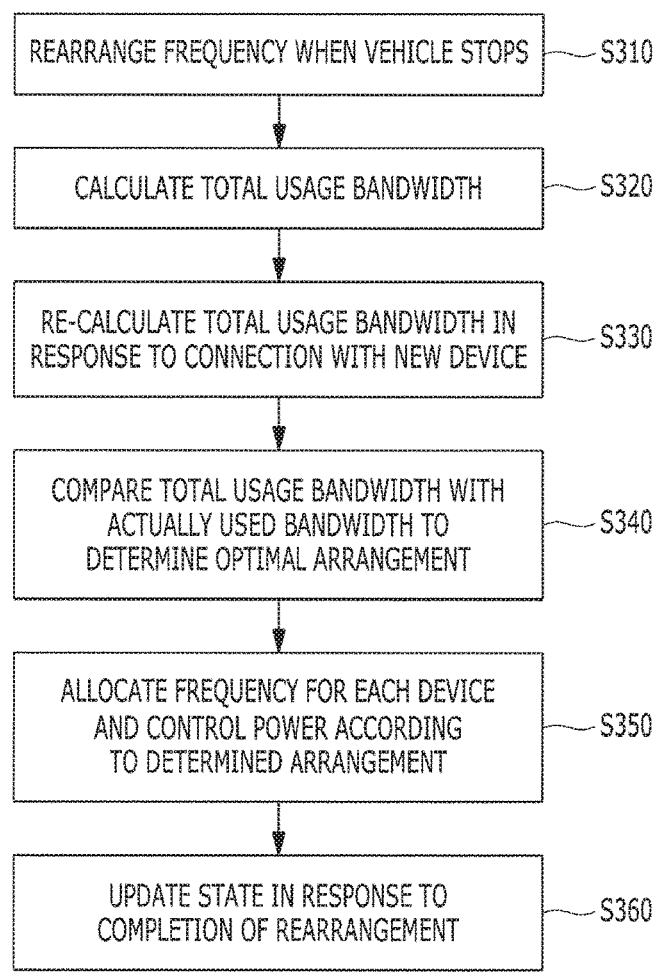
FIG. 3 is a flowchart illustrating an example of a frequency readjustment procedure according to an embodiment of the present disclosure.

FIG. 3 is a flowchart illustrating an example of a frequency readjustment procedure according to an embodiment of the present disclosure. FIGS. 4A to 4D illustrate an example of frequency arrangement to understand each operation of the flowchart of FIG. 3.

Referring to FIG. 3, when a vehicle stops, a frequency rearrangement procedure may begin (S310).

The frequency manager may calculate a total usage bandwidth in an entire available bandwidth (S320).

Figure 4A:
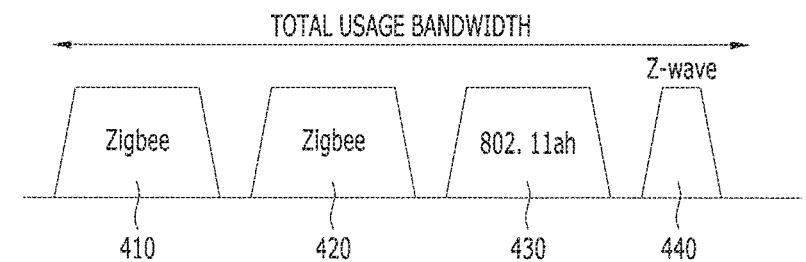
FIGS. 4A to 4D illustrate an example of frequency arrangement to understand each operation of the flowchart of FIG. 3.

For example, referring to FIG. 4A, an entire length of a horizontal axis may correspond to a size of an entire available bandwidth. In addition, a frequency band 410 occupied by a first device using the Zigbee protocol, a frequency band 420 occupied by a second device using the Zigbee protocol, a frequency band 430 occupied by a third device using the 802.11ah protocol, and a frequency band 440 occupied by a fourth device using the Z-wave protocol may be present along the horizontal axis from an entire available bandwidth. Here, the total usage bandwidth may be a portion to a right end of the frequency band 440 occupied by the fourth device from the left end of the frequency band 410 occupied by the first device.

As a new device is connected, a total usage bandwidth may be recalculated in consideration of a bandwidth to be occupied by the new device (S330). Then, the frequency manager may compare the recalculated total usage bandwidth and a bandwidth that is actually used by each device to determine optimal arrangement (S340). In this case, the bandwidth that is actually used by each device may be calculated through a bandwidth and center frequency of each device.

Figure 4B:
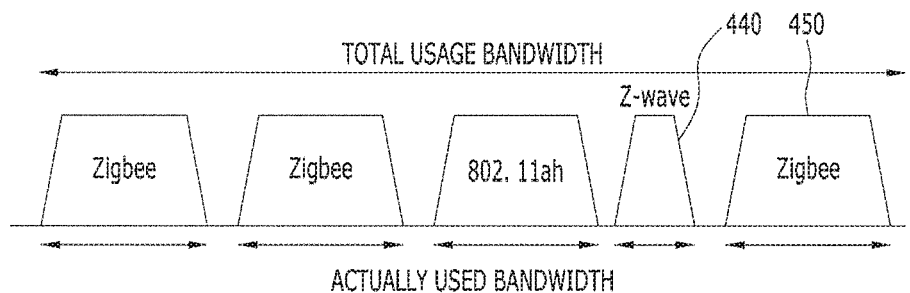

For example, as shown in FIG. 4B, as a new device further occupies a frequency band 450, the total usage bandwidth may be a portion to a right end of the frequency band 450 occupied by the new device from a left end of the frequency band 410 occupied by the first device. The actually used bandwidth may be calculated as a size of a bandwidth that is actually used by each device by excluding an interval between bandwidths occupied by respective devices. The frequency manager may determine that the frequency band 430 occupied by the third device is shifted to a band of a right edge and the frequency band 440 occupied by the fourth device and the frequency band 450 occupied by the new device are adjacently shifted to the left, based on the calculation result, as shown in FIG. 4C.

Accordingly, the frequency manager may allocate a frequency for each device that participates in frequency rearrangement according to the determined arrangement, and simultaneously, control a power on and off order of each device (S350). When rearrangement is completed, the frequency manager may update a frequency occupation state for each device (S360).

Figure 4C:
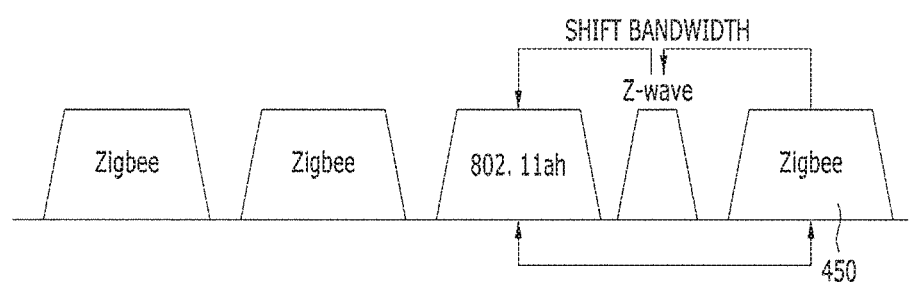
Figure 4D:
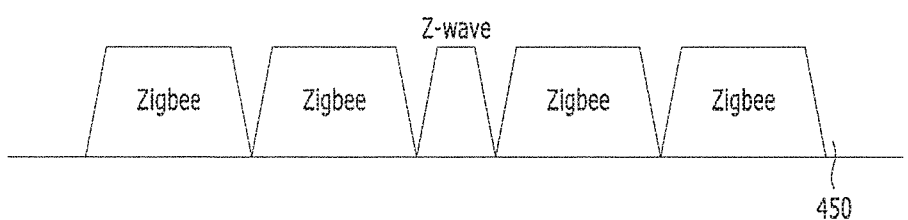

For example, in the state shown in FIG. 4C, upon allocating a new frequency to rearrange frequencies of the third device, the fourth device, and the fifth device and then first turning off the third device to empty a frequency band occupied by a corresponding device, the frequency manager may sequentially turn off the fourth device and the fifth device, may turn on the fourth device to use a frequency next to the frequency band 420 occupied by the second device and, then, may turn on the fifth device to use an just next frequency. Lastly, when the third device is turned on to occupy a frequency just next to the frequency occupied by the fifth device, frequency readjustment may be completely performed, as shown in FIG. 4D.

In the aforementioned embodiments, frequency readjustment is performed based on a state in which a vehicle stops. According to another embodiment of the present disclosure, when a vehicle is driven, connection with some devices may be released such that frequency readjustment is rapidly performed as necessary. This will be described with reference to FIGS. 5A to 5C.

Figure 5A:
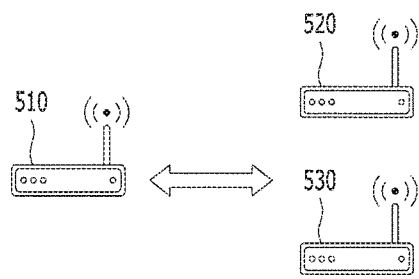
FIGS. 5A to 5C are diagrams illustrating another example of a frequency readjustment procedure according to an embodiment of the present disclosure.
Figure 5B:
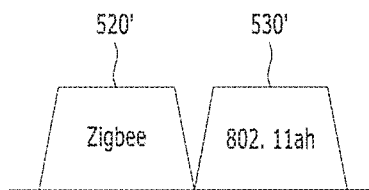
Figure 5C:
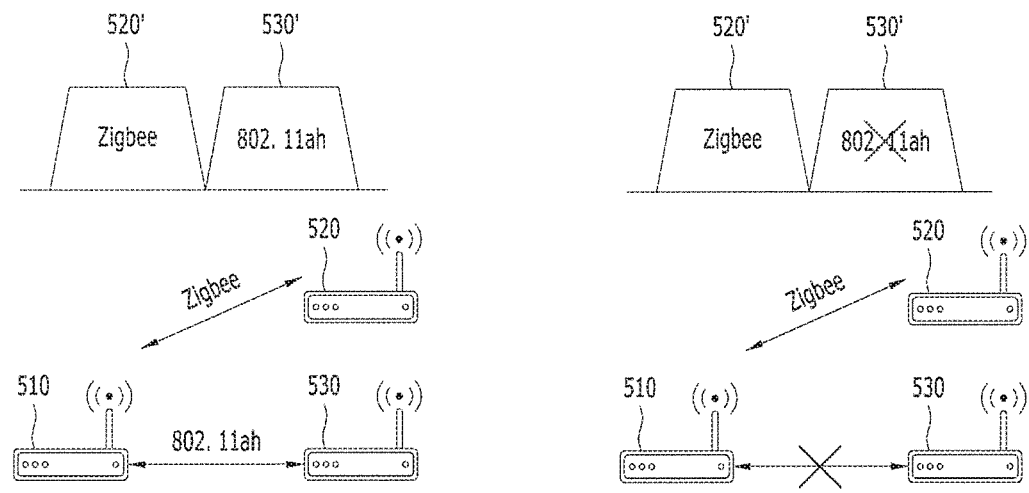

FIGS. 5A to 5C are diagrams illustrating another example of a frequency readjustment procedure according to an embodiment of the present disclosure.

Referring to FIG. 5A, a frequency manager 510 and a plurality of IoT devices 520 and 530 in a vehicle may collect information via transmission and reception of each module. Thereby, information on a frequency band occupied by each of the devices 520 and 530 in an available frequency band may be acquired by the frequency manager 510.

Here, change in frequency band is not large in a stop state, and thus, the frequency manager 510 may calculate occupied frequency bands 520' and 530' of the respective devices 520 and 530 in the current situation and perform the aforementioned frequency readjustment, as shown in FIG. 5B.

However, when the vehicle is driven, the possibility that change in frequency band is relatively larger than a stop state is high, thereby causing interference with adjacent signals in a band. Accordingly, instead of frequency rearrangement, the frequency manager 510 may terminate signal connection (here, connection with the device 530 that operates according to the 802.11ah protocol) in a band when a specific band is instable, as shown in FIG. 5C. In this case, a reference for selection of the terminated device may be a traffic amount, a sequential order of connection, priority preset by a driver, or the like but may not be limited thereto.

Hereinafter, a structure of a frequency manager according to the aforementioned embodiments will be described assuming that the frequency manager is an audio/video/navigation (AVN) system (or an AVN controller) of a vehicle.

Figure 6:
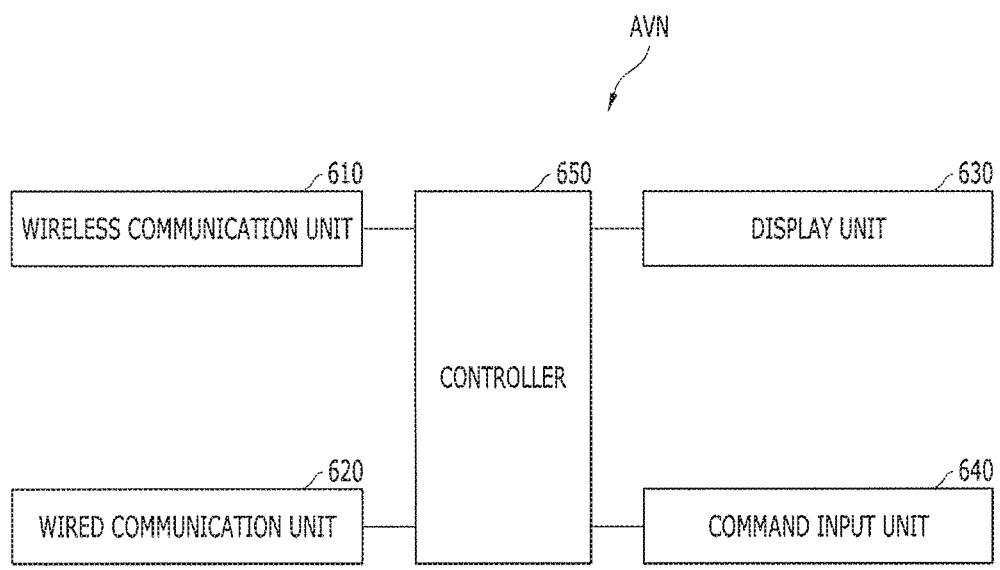
FIG. 6 is a block diagram illustrating an example of an audio video navigation (AVN) system according to an embodiment of the present disclosure.

FIG. 6 is a block diagram illustrating an example of an AVN system according to an embodiment of the present disclosure.

Referring to FIG. 6, the AVN system of a vehicle may include a wireless communication unit 610 for exchanging data with peripheral devices using a wireless communication method, a wired communication unit 620 for exchanging a signal with other controllers of a vehicle, such as a speed sensor, a transmission controller, a motor controller, and an engine controller, for providing information for determining a vehicle driving state, a display unit 630 for displaying a list of various functions or an execution image and a navigation image, a command input unit 640 for receiving a command from a driver through a touchpad, a key button, or the like, and a controller 650 for controlling the aforementioned components and performing determination and calculation required to implement the present embodiment. For example, the controller 650 may control the wireless communication unit 610 to perform wireless connection with peripheral devices, determine frequency spectrum and rearrangement depending on frequency characteristics based on a vehicle driving state during connection with a new device, and control the wireless communication unit 610 to transmit a control signal corresponding to the determination to connected devices.

Needless to say, the components of FIG. 6 are exemplary and, thus, it would be obvious to one of ordinary skill in the art that greater or fewer components may be included as necessary. For example, a wireless communication unit may be included in a controller present outside the AVN system and may further include a sound output unit for outputting a guidance voice, warning horn, and so on of multimedia or a navigation player. In addition, a function of a frequency manager may be distributed and implemented by one or more other controllers and, in this case, components for performing functions according to the present disclosure may be further included in addition to the components of FIG. 6. In addition, the frequency manger may be implemented with a separate controller for performing the function.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

According to the aforementioned at least one embodiment of the present disclosure, a frequency band may be more effectively managed.

In particular, frequency shift and device control may be performed in consideration of a driving state of a vehicle in a vehicle environment, thereby effectively alleviating an issue in terms of insufficient wireless resources due to simultaneous operations of a plurality of devices in a relatively narrow space.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method of optimizing a frequency band by a vehicle controller, the method comprising:
   upon wirelessly connecting a new device to the vehicle controller, first determining a frequency characteristic of the new device;
   second determining whether a frequency band is capable of being allocated to the new device in an available frequency band by using the determined frequency characteristic; and
   when the frequency band is not capable of being allocated to the new device as the second determination result, readjusting a bandwidth occupied by one or more pre-connected devices to ensure a band to be allocated to the new device,
   wherein the readjusting of the bandwidth includes shifting a position of a bandwidth occupied by at least one device of the one or more pre-connected devices on a frequency axis, and
   wherein the shifting of the position of the bandwidth is performed by sequentially releasing connection with the at least one device and then performing reconnection.

2. The method according to claim 1, wherein the first determining comprises determining the frequency characteristic through a packet exchanged with the new device.

3. The method according to claim 1, further comprising, upon determining that an idle band corresponding to the frequency characteristic of the new device is present in the available frequency band as the second determination result, allocating the idle band to the new device.

4. The method according to claim 1, wherein the second determining comprises determining a total usage bandwidth occupied by the one or more pre-connected devices and an actually used bandwidth.

5. The method according to claim 4, wherein the actually used bandwidth is determined using a center frequency used by each of the one or more pre-connected devices and a size of a bandwidth defined in a protocol with which each of the one or more pre-connected devices complies.

6. The method according to claim 5, wherein information on the size of the bandwidth defined in the protocol, with which each of the one or more pre-connected devices complies, is pre-stored in the controller.

7. The method according to claim 1, further comprising, when the band to be allocated to the new device is not capable of being ensured even if the readjusting is performed, releasing connection with the new device.

8. A non-transitory computer readable recording medium having recorded thereon a program for executing a method of optimizing a frequency band by a vehicle controller, wherein the method comprises:
   upon wirelessly connecting a new device to the vehicle controller, first determining a frequency characteristic of the new device;
   second determining whether a frequency band is capable of being allocated to the new device in an available frequency band by using the determined frequency characteristic; and
   when the frequency band is not capable of being allocated to the new device as the second determination result, readjusting a bandwidth occupied by one or more pre-connected devices to ensure a band to be allocated to the new device,
   wherein the readjusting of the bandwidth includes shifting a position of a bandwidth occupied by at least one device of the one or more pre-connected devices on a frequency axis, and
   wherein the shifting of the position of the bandwidth is performed by sequentially releasing connection with the at least one device and then performing reconnection.

9. A frequency band management controller of a vehicle for optimizing a frequency band, comprising:
   a wireless communication unit configured to wirelessly exchange data with one or more device; and
   a controller configured to, upon connecting a new device through the wireless communication unit, determine frequency characteristic of the new device, determine whether a frequency band is capable of being allocated to the new device in an available frequency band by using the determined frequency characteristic, and when the frequency band is not capable of being allocated to the new device, readjust a bandwidth occupied by one or more pre-connected devices to ensure a band to be allocated to the new device, wherein the controller readjusts the bandwidth to shift a position of a bandwidth occupied by at least one device of the one or more pre-connected devices on a frequency axis, and wherein the controller shifts the position of the bandwidth by sequentially releasing connection with the at least one device and then performing reconnection.

10. The frequency band management controller according to claim 9, wherein the controller determines the frequency characteristic through a packet exchanged with the new device.

11. The frequency band management controller according to claim 9, wherein, upon determining that an idle band corresponding to the frequency characteristic of the new device is present in the available frequency band as the determination result of whether the frequency band is capable of being allocated, the controller allocates the idle band through the wireless communication unit.

12. The frequency band management controller according to claim 9, wherein the controller determines a total usage bandwidth occupied by the one or more pre-connected devices and an actually used bandwidth to determine whether the frequency band is capable of being allocated.

13. The frequency band management controller according to claim 12, wherein the controller determines the actually used bandwidth by using a center frequency used by each of the one or more pre-connected devices and a size of a bandwidth defined in a protocol with which each of the one or more pre-connected devices complies.

14. The frequency band management controller according to claim 13, further comprising a memory configured to store information on the size of the bandwidth defined in the protocol with which each of the one or more pre-connected devices complies.

15. The frequency band management controller according to claim 9, wherein, when the band to be allocated to the new device is not capable of being ensured even if the readjusting is performed, the controller releases connection with the new device.

\* \* \* \* \*